United States Patent
Wickramasinghe et al.

(10) Patent No.: US 6,433,310 B1
(45) Date of Patent: Aug. 13, 2002

(54) ASSEMBLY SUITABLE FOR READING/WRITING/ERASING INFORMATION ON A MEDIA BASED ON THERMAL COUPLING

(75) Inventors: Hemantha Kumar Wickramasinghe, Chappaqua; Hendrik F. Hamann, Mohegan Lake; Yves Martin, Ossining, all of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/773,346

(22) Filed: Jan. 31, 2001

(51) Int. Cl.[7] .............................. G11C 7/00; G11B 5/127
(52) U.S. Cl. ....................... 219/216; 219/494; 219/510; 219/388; 365/108; 369/127; 369/135
(58) Field of Search .................................. 219/216, 494, 219/510, 388; 374/129, 132; 365/106–108, 113; 369/127, 135, 153, 154

(56) References Cited

U.S. PATENT DOCUMENTS

| 5,444,651 A | * | 8/1995 | Yamamoto et al. | 365/108 |
| 5,579,199 A | * | 11/1996 | Kawamura et al. | 365/108 |
| 2002/0017701 A1 | * | 2/2002 | Klersy et al. | 257/536 |

* cited by examiner

Primary Examiner—Joseph Pelham
(74) Attorney, Agent, or Firm—Stephen C. Kaufman

(57) ABSTRACT

A thermal assembly comprising at once a reading-writing-erasing capability. The present invention, accordingly, can realize important advantages of providing dual yet independent capabilities or functionalities for manifesting reading-writing-erasing on the nanometer scale. An illustrative such thermal assembly includes a thermal heater for writing on a media; a temperature sensor capable of monitoring thermal coupling between the sensor and the media; and, a heater element for heating the temperature sensor.

8 Claims, 14 Drawing Sheets

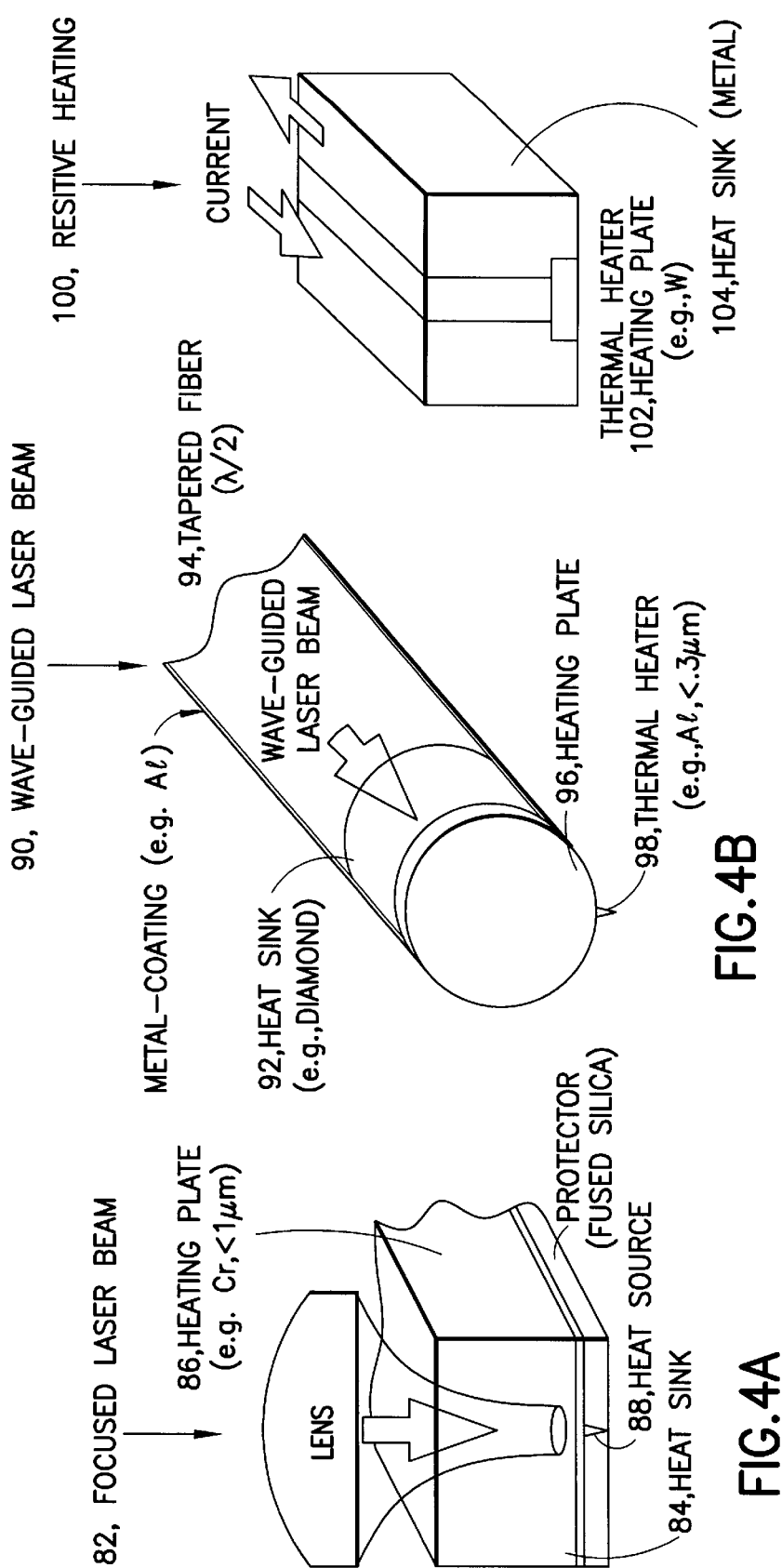

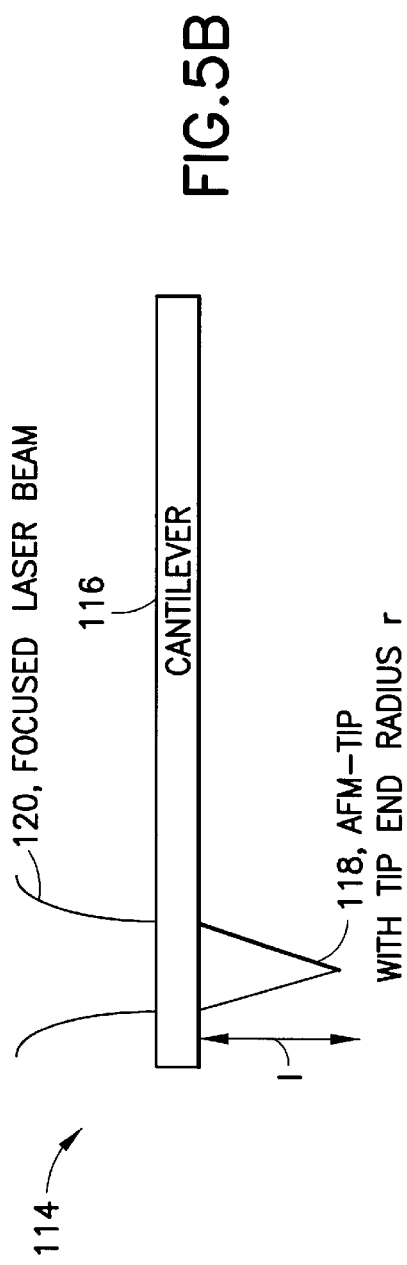
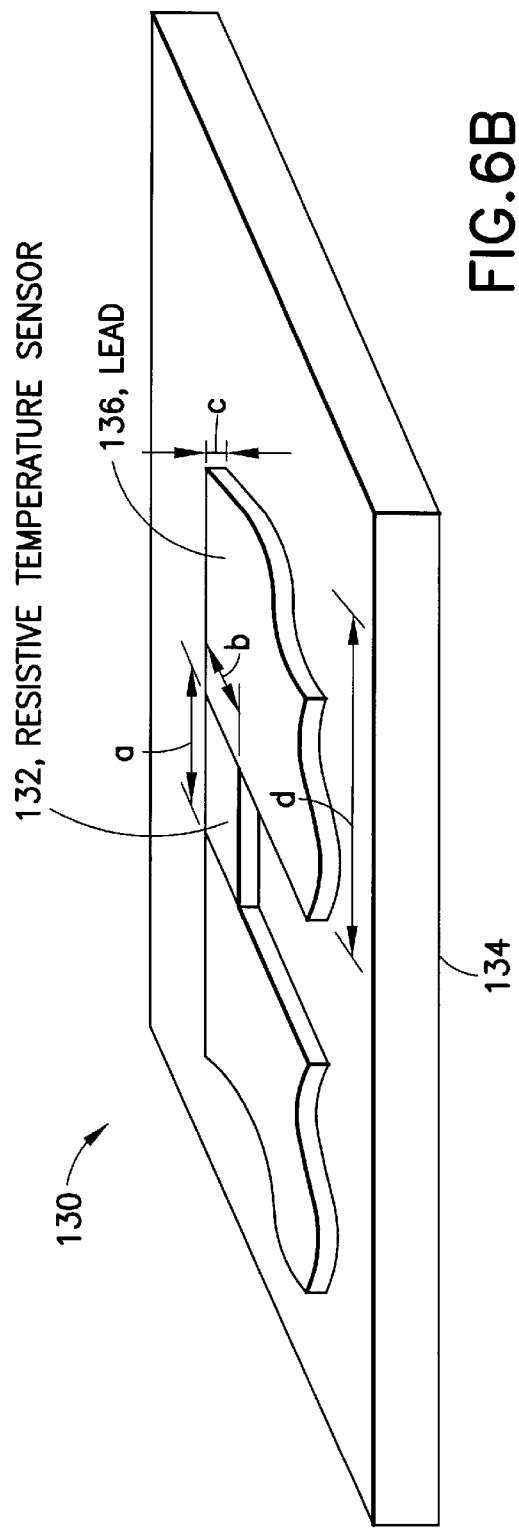

ASSEMBLY SUITABLE FOR READING/WRITING/ERASING INFORMATION ON A MEDIA BASED ON THERMAL COUPLING

CROSS-REFERENCE TO RELATED APPLICATIONS

The instant application is related to U.S. application Ser. No. 09/408,946, filed Sep. 30, 1999 by Wickramasinghe et al.; and, to U.S. application Ser. No. 09/427,169, filed Oct. 26, 1999 by Hamann et al.; and, to U.S. application Ser. No. 09/512,248, filed Feb. 24, 2000 by Hamann et al.; and to U.S. application Ser. No. 09/540,726 filed Mar. 31, 2000 by Hamann et al.; and, to U.S. application Ser. No. 09/559,489, filed Apr. 27, 2000 by Hamann et al.; and to the following contemporaneously filed U.S. applications, namely, Ser. No. 09/774,851, filed Jan. 31, 2001 by Wickramasinghe et al.; and, to U.S. application Ser. No. 09/774,943, filed Jan. 31, 2001 by Wickramasinghe et al.; and, to U.S. application Ser. No. 09/773,323, filed Jan. 31, 2001 by Wickramasinghe et al. All of these applications are co-pending, commonly assigned, and incorporated by reference herein.

FIELD OF THE INVENTION

This invention relates to a novel assembly suitable for reading/writing and/or erasing high density data or information on a media based on thermal coupling.

INTRODUCTION TO THE INVENTION

The instant invention builds upon concepts and assemblies disclosed in the cross-referenced applications. In particular, we reference IBM docket YOR920010056, which discloses a novel assembly suitable for reading data based on thermal coupling between the novel assembly and a storage media, and, IBM docket YOR920010062 which discloses a novel assembly suitable for writing and/or erasing high density data on a media. The novel assembly for reading data and the novel assembly for writing/erasing data each severally can provide important and critical advantages by having structural capabilities which enable the assemblies to work at speeds and resolutions which can qualitatively and profoundly transcend the delimitation of diffraction limited focused laser beam technologies. For example, the novel reading assembly can provide capabilities for reading information on a storage media, e.g., a phase-change media at high speed (e.g., greater than 0.01 MHZ, illustratively 100 MHZ) and, at a resolution such that there are storage densities larger than 1 Gbit/in$^2$, the novel writing assembly complements these specifications.

SUMMARY OF THE INVENTION

As noted above, the present invention builds upon the just disclosed assemblies severally dedicated to a reading and to a writing/erasing capability, by disclosing a novel thermal assembly comprising at once a reading-writing-erasing capability. The present invention, accordingly, can realize important advantages of providing dual yet independent capabilities or functionalities for manifesting reading-writing-erasing on the nanometer scale.

The present invention advantageously uses the idea of direct thermal coupling between the assembly and a media. In this regard, we note that this direct thermal coupling can subsume far-field and/or near-field effects. In particular, near-field effects may include a continuum that may extend from coupling that subsumes at least one portion of the thermal near-field; ranging, e.g., from partially inclusive, to substantially or even complete coupling in the thermal near-field.

Accordingly, in a first aspect of the present invention, we disclose a reading/writing/ erasing assembly comprising:
  i) a thermal heater for writing on a media;
  ii) a temperature sensor capable of monitoring thermal coupling between the sensor and a media; and
  iii) a heater element for heating the temperature sensor.

In a second aspect of the present invention, we disclose a reading/writing/erasing assembly comprising:
  i) a thermal heater element for writing on a media and/or for heating the temperature sensor; and
  ii) a temperature sensor capable of monitoring thermal coupling between the sensor and the media.

In a third aspect of the present invention, we disclose a reading/writing/erasing assembly comprising:
  i) a thermal heater for writing on a media; and
  ii) a device comprising;
     a) a temperature sensor capable of monitoring thermal coupling between the sensor and a media; and
     b) a heater element for heating the temperature sensor.

In a fourth aspect of the present invention, we disclose a reading/writing/erasing assembly comprising:
  a device comprising;
     a) a temperature sensor capable of monitoring thermal coupling between the sensor and a media; and
     b) a thermal heater element for heating the temperature sensor and for writing on a media.

BRIEF DESCRIPTION OF THE DRAWING

The invention is illustrated in the accompanying drawing (not drawn to scale), in which:

FIGS. 4A–C show alternative embodiments of means of supplying energy to the thermal heaters;

FIGS. 5A–B show possible heater elements, which may be used in the FIG. 1 generalized assemblies;

FIGS. 6A–B show possible temperature sensors, which may be used in the FIG. 1 generalized assemblies;

DETAILED DESCRIPTION OF THE PRESENT INVENTION

Figure 1A:
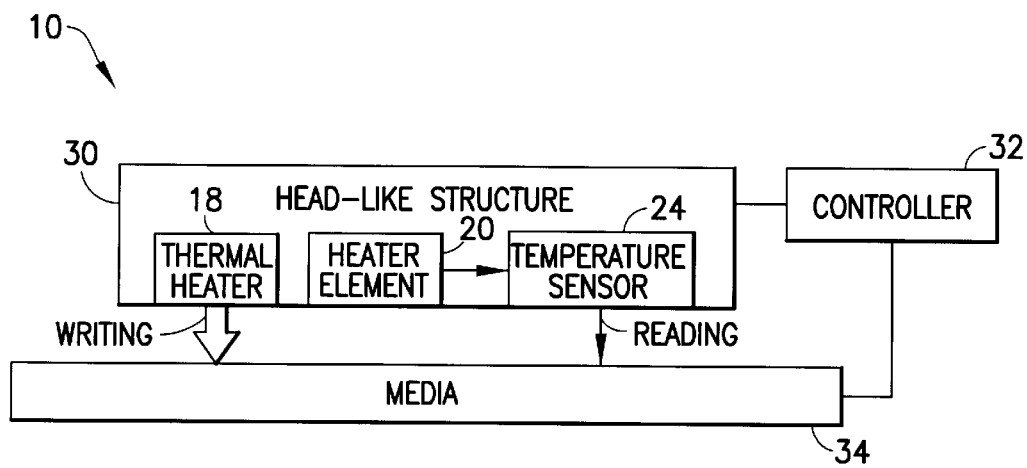
FIGS. 1A–D show generalized assemblies of the four different aspects of the present invention.
Figure 1B:
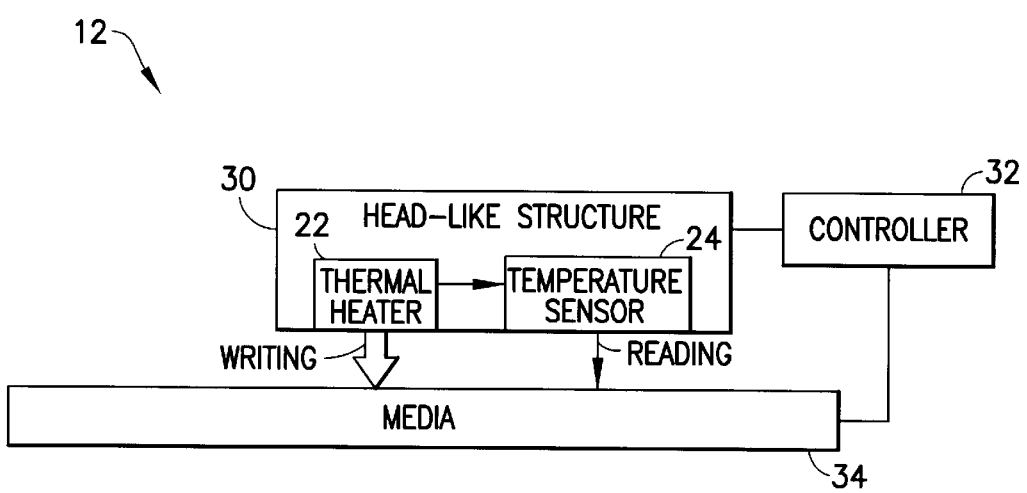
Figure 1C:
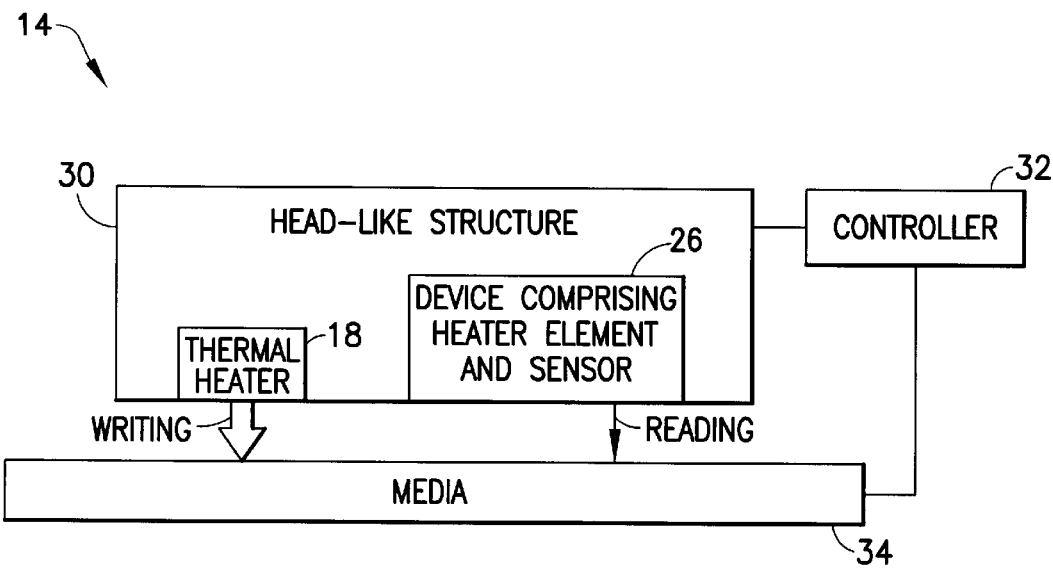
Figure 1D:
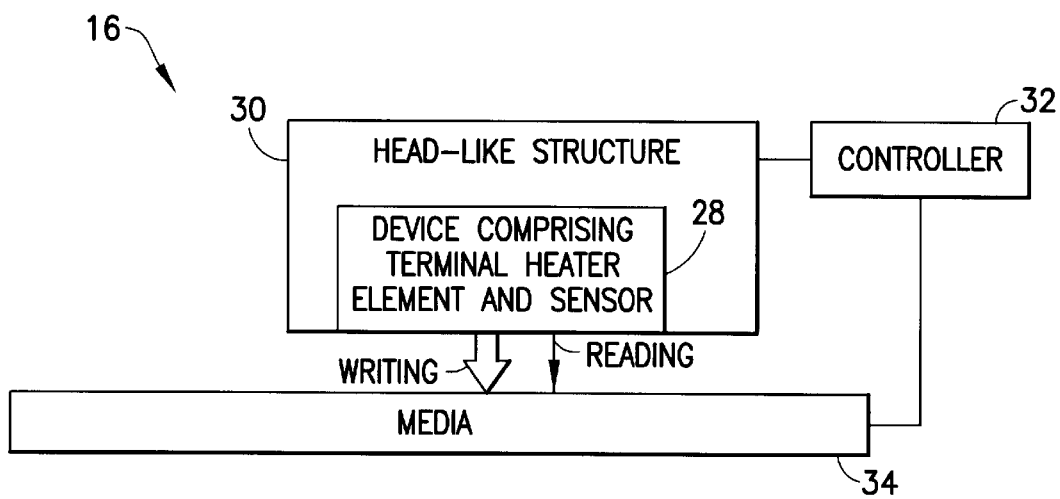

FIGS. 1A–D show generalized assemblies (10–16) of four different aspects of the present invention. The assemblies may have the following components in common:
  1) a thermal heater (18) for writing on a media;
  2) a heater element (20) for heating the temperature sensor;
  3) a thermal heater element (22) for heating the temperature sensor and/or for writing on a media;

4) a temperature sensor (24);

5) a device (26) comprising a heater element and a temperature sensor capable of reading;

6) a device (28) comprising a thermal heater element and a temperature sensor capable of reading and writing;

7) a head-like structure (30);

8) a controller (32) for mutual positioning; and 9) a read/write/erase storage media (34).

In the following, we discuss these different elements in more detail.

Heater-structures:

For clarification purposes, we usefully distinguish between the different sorts of heaters which are incorporated in these assemblies (see FIGS. 1A–D), by way of their functions. Specifically, we may refer to a thermal heater if the heater is used for writing data on a media; we may refer to a heater element if the heater is used to heat the temperature sensor; and, finally, we may refer to a thermal heater element if the heater is used to heat the temperature sensor and/or to write on a media. From a design point of view, we note, however, that the differences between the heaters are only minor and our terminology is invoked for pedagogical purposes.

a) Thermal Heater

The thermal heater (18) induces a thermal coupling, preferably in the near-field, thereby writing on a media (34). A suitable thermal heater (18) may comprise two elements: a heating plate that can operate as a heat source; and, a heat sink attached to the heating plate; the thermal heater capable of developing a thermal coupling with the media, preferably in the near-field.

Attention is now directed to FIGS. 2A–D, which help illustrate the many different geometrical, dimensional, and material configurations which may be suitably adapted for a particular realization of a novel thermal heater. In overview of the FIGS. 2A–D thermal heaters, it is noted that their purpose is to deposit heat/energy to the media. Good geometrical conductors for thermal heaters may include rectangular or cylindrical design, of the type shown in FIGS. 2A and 2B, respectively (numerals 36–46).

For example, the preferred dimensions of $y_1$ and $z_1$ (FIG. 2A) or $r_1$ (FIG. 2B) are informed by the way the thermal energy is deposited. For instance, if one uses a focused laser beam to heat up the heating plates (38, 44), $y_1$ and $z_1$ or $r_1$ preferably are larger than the waist of the laser focus (e.g., for a numerical aperture of 0.8 at a wavelength of $\lambda=1$ $\mu$m $y_1$, $z_1$, $r_1 > 0.4$ $\mu$m). If on the other hand, one uses a waveguided laser beam, then the heating plate (38,44) preferably is attached right onto the end of a fiber (e.g., via a deposition technique). Therefore, the heating plate (44) preferably has a cylindrical shape, and $r_1$ is determined by the wave-guide size. More specifically, for a single mode fiber in the visible wavelength range, $r_1$ preferably is approximately 3–4 $\mu$m. If one uses tapered fiber, $r_1$ preferably is larger than or equal $\approx \lambda/2$, where $\lambda$ is the wavelength of the utilized laser light. If, alternatively, one uses resistive heating, then one chooses, most likely, a rectangular shape, and the dimensions are preferably dominated by the connections and the preferred resistance. In the case of resistive heating, these dimensions can be rather small ($y_1$ $z_1 < 0.1$ $\mu$m) if they are made via an appropriate method such as e-beam lithography. We note that in the case of resistive heating, the dimensions as well as the material determine the actual resistance, and hence the heating.

While the $y_1$, $z_1$, $r_1$ dimensions are determined mostly by practical needs, the thickness of the heating plate (38,44) itself should be rather small ($d_1$, $x_1 < 0.5$ $\mu$m), for example, if the device is to be used for high speed recording. More specifically, in high speed applications, one preferably uses energy pulses to deposit the heat in the heating plate, so as to subsequently heat up the near-field heat source, e.g., a tip or an edge of the heating plate. In order to heat up again, the deposited heat (from a last pulse), has to be dissipated. This dissipation is governed by the thermal diffusion length $l=(\kappa \cdot t)^{0.5}$, where $\kappa$ is the thermal diffusivity and t is the time after the arrival of a heat pulse. Specifically, the heat in a good thermal conductor (approximately $\kappa=2 \cdot 10^{-5}$ $m^2 s^{-1}$) can diffuse a distance of 0.45 $\mu$m in only 10 ns, corresponding to recording rates of 100 MHz. If one uses a laser beam to deposit the heat, it is noted that the heating plate (38,44) preferably should be at least of the thickness of the skin depth at the laser frequency. Specifically, for a very high absorbing material (e.g., Al) it preferably is larger than 10 nm at 633 nm.

The heating plate (38,44) can be made out of any material, but in general the following requirements preferably exist. (1) The material preferably has a high melting point (T>1100K), generally higher than the temperature, which is necessary for the recording. (2) The material preferably is chemically stable at the operating temperatures. (3) It preferably has a high thermal diffusivity ($\kappa > 10^{-5}$ $m^2 s^{-1}$, e.g., metals and alloys). (4) The material preferably is high absorbing if a laser is used for the heating (e.g., Cr, Al). (5) If the heating plate operates as the heat source, a resistive conductor may be preferred, especially in order to maximize the heat transfer from the heater to the phase-change material via near-field coupling.

Figure 2A:
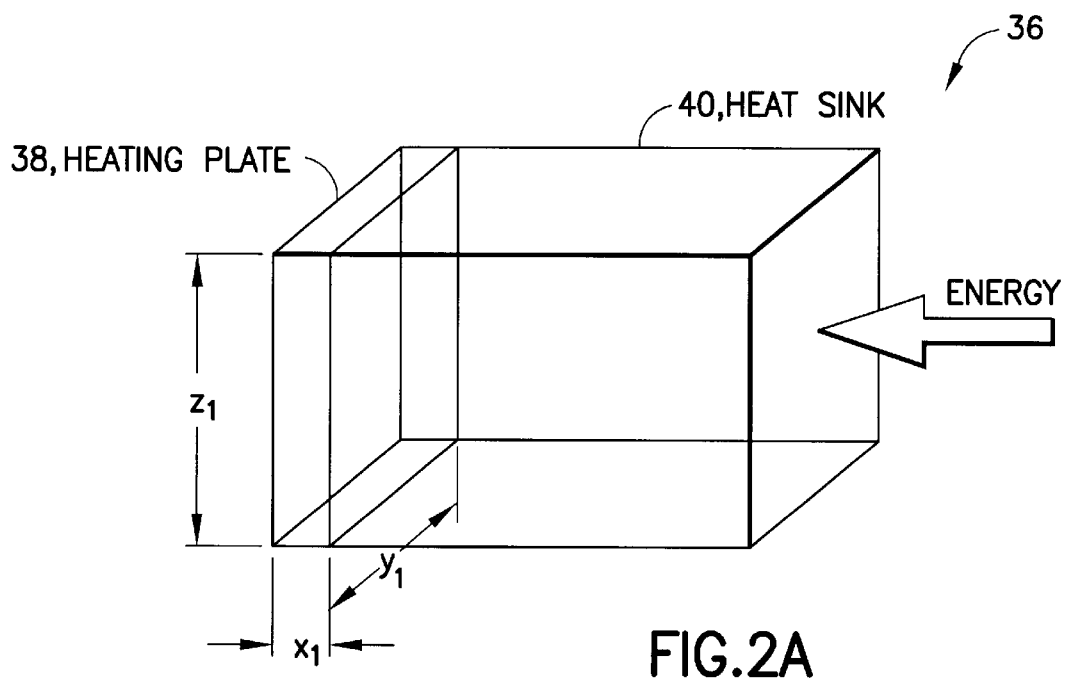
FIGS. 2A–D illustrate alternative embodiments which may be suitably adapted for a particular realization of thermal heaters that are preferably employed in the FIG. 1 generalized assemblies.
Figure 2B:
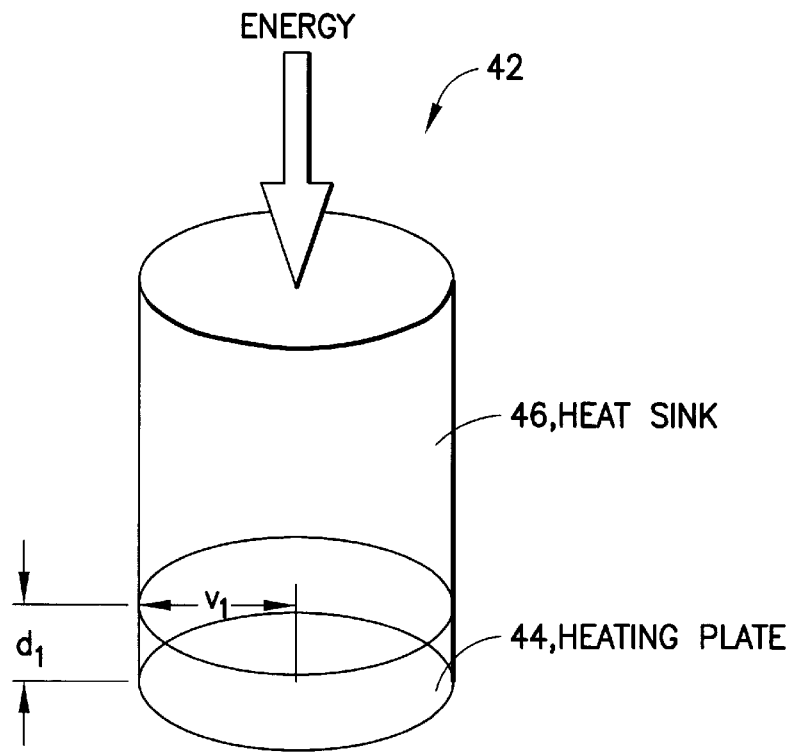
Figure 2C:
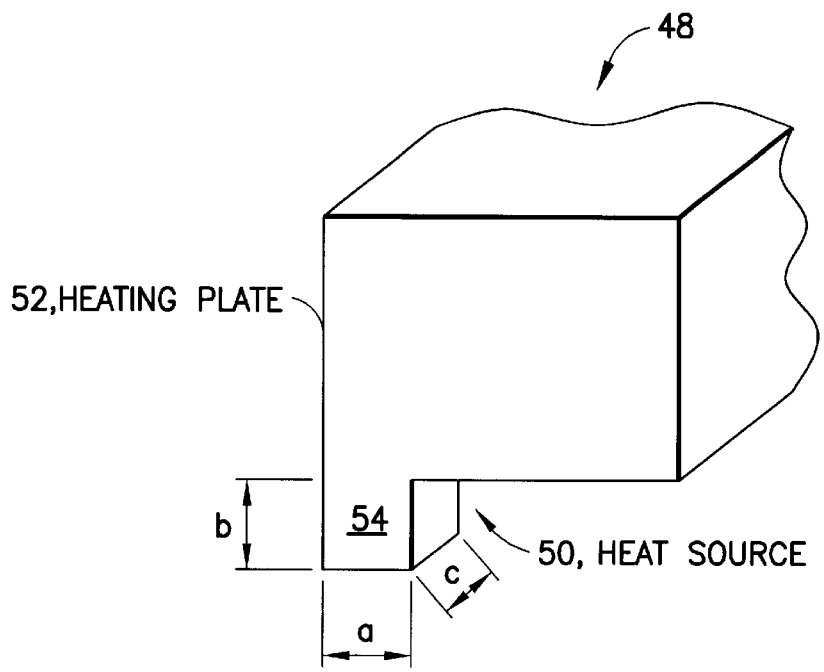
Figure 2D:
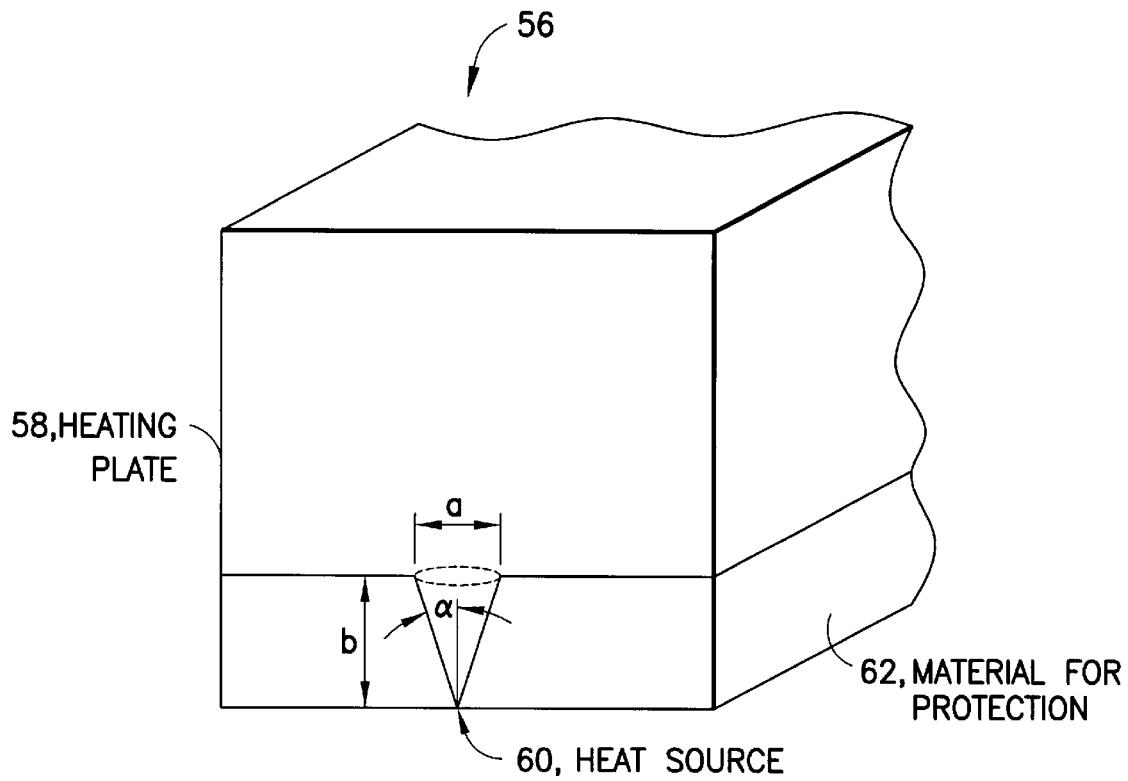

As explained above, a generic purpose of the heat plate operating as a heat source is to guide the thermal energy to the media (34). It should be noted that the heating plate is generally hot, and hence generally capable of heating the media. However, such general heating may not always be optimal, since the dimensions of the heating plate may be large, resulting in a large bit. One purpose of the heat source, accordingly, may be to avoid general heating from the heating plate, and to instead focus the thermal energy to a very small point. An attendant and novel property is then to generate a thermal near-field, which can interact very locally, preferably on a nanometer scale, with the media. To this end, the heating plate operating as a heat source can have all kinds of shapes and dimensions. For example, the heat source may be just an edge (54) of a heating plate (52) (FIG. 2C, numerals 48–54), or a truncated cone (60) of a heating plate (58) (FIG. 2D, numerals 56–62). Sometimes, the heat source may be usefully protected by some low heat conducting material (62) (e.g., glass).

Overall, the shape and dimensions of the heating plate operating as a heat source are influenced by the following requirements. (1) For high speed application, a designer preferably chooses shape and dimensions which transfer the heat as fast as possible. In general, that means that a heat source preferably should have a small length b (e.g., b<0.51 $\mu$m), in order to achieve sufficient heat dissipation considering possible reading/erasing rates as high as 100 MHz. If one just considers high speed applications, one may be tempted to choose large dimensions of a, c (FIG. 2C) and a, $\alpha$ (FIG. 2D) in order to avoid a slow one-dimensional heat conduction. (2) However, besides high speed, a heat source preferably provides a very local heating, avoiding any stray heat from the heating plate, generally, Accordingly, this correlates with opposite requirements for the dimensions. For a very local heating, preferably choose b large (>0.1 $\mu$m), and the dimensions a,c small (<0.01 $\mu$m) (FIG. 2C) as well as a small a and a (a <0.1 μm, α<15°, FIG. 2D). We note increasing power loss with decreasing dimensions in a,c (FIG. 2C) and a,α (FIG. 2D), which may result in insufficient and very ineffective heating. (3) The shape and dimensions of the heat source are preferably matched to a bit size and a bit pattern. In general, the bits are typically larger or equal to the dimensions of a heat source. Specifically, for a 20 nm bit, preferably work with a heat source of the dimensions a,c<<20 nm (FIG. 2C). (4) Finally, in order to maximize the thermal near-field coupling (as outlined further below), an elongated shape with a sharp tip-like point may be preferred. The material of the heating plate can be almost any kind. We note that an edge or tip material is preferably governed by the same general material requirements as that of the heating plate, proper.

Figure 3A:
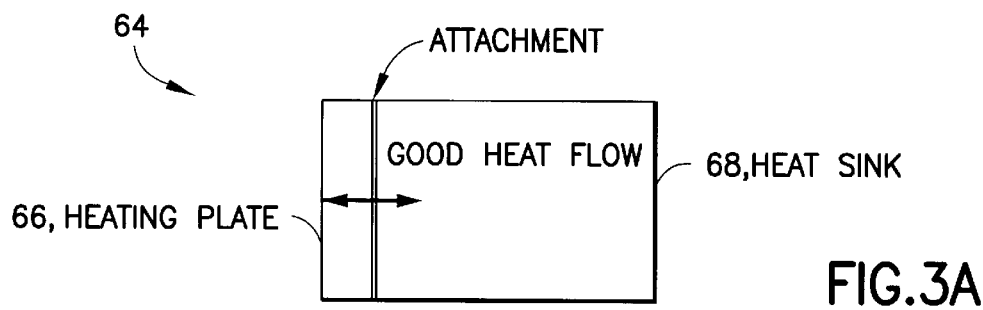
FIGS. 3A–C show further particulars of the FIGS. 2A–D thermal heaters with emphasis on the heating plate.

We recall from above that our preferred thermal heater includes a second element, namely, a heat sink attached to the heating plate. We now turn our particular attention to this second element. An important purpose of the heat sink is to dissipate deposited heat as fast as possible, in order to get ready for a new heating pulse. Therefore, the heat sink is preferably attached to the heating plate (FIG. 3A, numerals 64–68). This attachment preferably is made in such a way that the heat diffusion and conduction between heat sink and heating plate is as good as possible (>20 W/mK, >$10^{-5}$ $m^2s^{-1}$). Therefore, it may be very advantageous if the heat sink and the heating plate are made out of the same piece of material. In other cases, the heat sink may be welded, glued, or deposited (via e-beam, vapor, sputtering etc.) right on the heating plate.

Figure 3B:
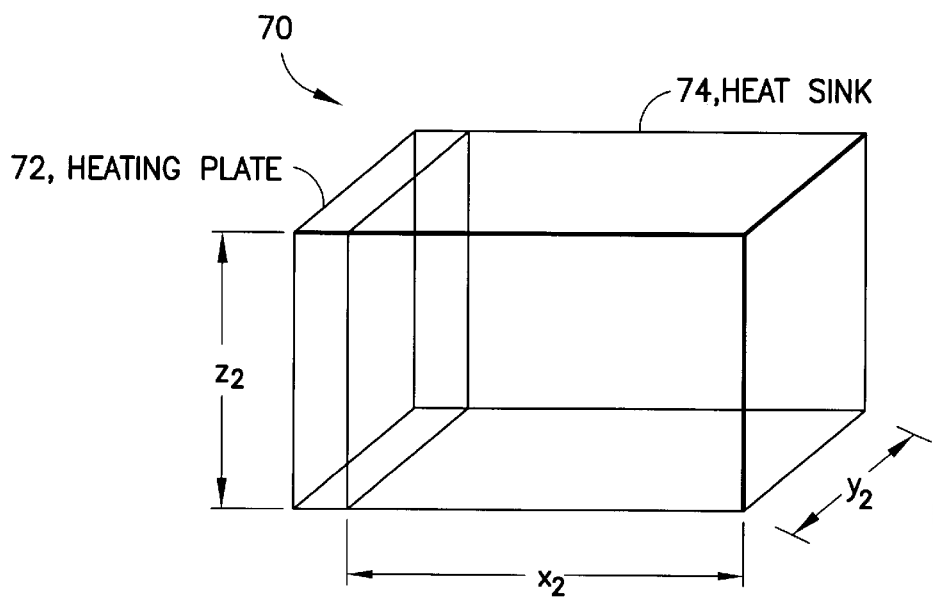
Figure 3C:
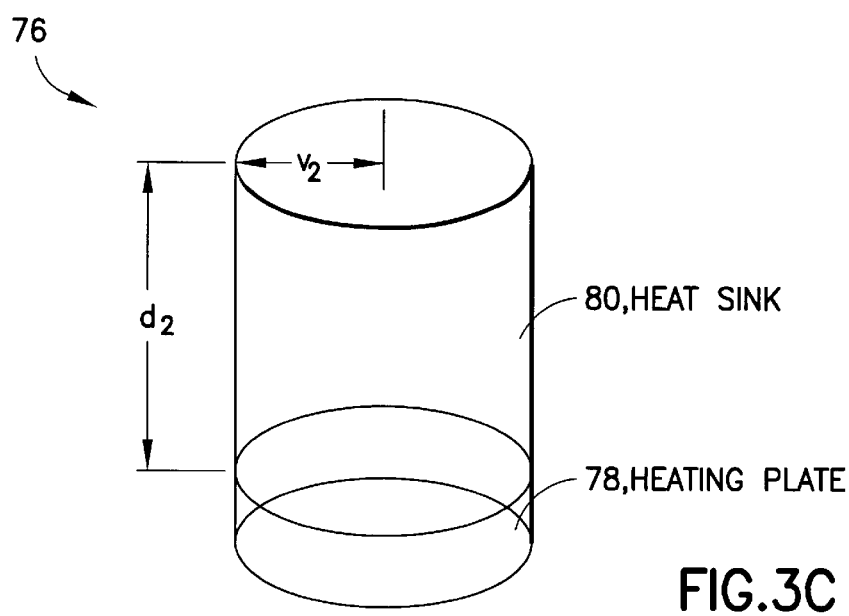

Dimensions and shape for the heat sink are not very critical, so that only guidelines can be given here. In general, the heat sink can have all kinds of shapes. However, in typical cases, it may be rectangular or cylindrical (see FIGS. 3B, C, numerals 70–80). To provide a sufficient heat sink mass, the heat sink preferably is as large as possible. Large dimensions (>1 μm) of $y_2$, $z_2$ and $r_2$ may result in a three-dimensional heat flow greatly enhancing the speed for heat dissipation. The dimensions and the shape of the heat sink do not have to necessarily match the dimensions of the attached heating plate. However, in general the heat sink preferably has dimensions larger or equal to the heating plate (e.g., $y_2 \geq y_1$, $z_2 \geq z_1$, $r_2 \geq r_1$). In terms of the thickness of the heat sink, we note that $d_2$ and $x_2$ should preferably be at least the thermal diffusion length 1 for a given heating repetition rate 1/t. The material of the heat source can be almost any kind. In analogy to the heating plate and the heat tip or edge, the material of the heat sink preferably has a high melting point as well as a high heat conductivity and diffusitivity. However, in some cases the material should not be high absorbing at the laser wavelength, if the laser has to be focused on the heating plate through the heat sink material. In such case, preferably use a transparent material, which is still a good heat conductor and has a high melting point (e.g., diamond).

There are different ways of supplying the energy to the thermal heater; examples are illustrated in FIGS. 4A, B, C. FIG. 4A shows a focused laser beam embodiment (82), wherein laser light is brought through a heat sink (84) onto a heating plate (86). In this case, we prefer the use of diamond as a heat sink material, which is transparent and has an excellent heat conductivity. An alternative material could be Sit if an infrared laser is used. The heating plate (86) can be very thin (0.1 μm) if a high absorbing material is used (e.g., Al, Cr.). Directly attached to the heating plate (86) is a heat tip or feature (88), which preferably is short (<0.3 μm). The material of the heat tip or feature (88) can be Cr as well or Al. In these cases, the heat tip or feature preferably is protected with a low heat conducting material, such as glass. Simple estimations about the heat flow suggest that such a device can record and/or erase data with >100 MFz.

FIG. 4B shows an alternative embodiment comprising a wave-guide laser beam (90) used 10 for the heating. In this embodiment, a heat sink (92), which preferably is made out of diamond, may be directly attached to the end of a tapered fiber (94). In other cases, a metal-coating (e.g., Al) of the wave-guide can be used as the heat sink. The wave-guide laser beam is absorbed by a thin (<0.1 μm) heating plate (96) directly attached to the fiber or heat sink. Again as a material, Cr or Al may be advantageous, which have generally a small skin depth (<0.02 μm). A heat source or tip (98) can be an edge or a little probe attached to the heating plate (96). In such a design, the heat source or tip exemplary has a length <0.3 μm.

FIG. 4C shows a further alternative embodiment wherein resistive heating (100) may be used to heat up a heating plate (102). As a heat sink (104), the transmission lines could be used, which may be out of a metal such as Cu. The two transmission lines are separated by a non-conducting material, for example, diamond or even quartz glass. Diamond has an advantage, in that it is a very good heat conductor, and can assist the heat sink (104). The two transmission lines are connected via the heating plate (102), which can act as a heat source. The heating plate (102) can be very small, e.g., (<0.05 μm). As a material for the heating plate and the heat source, tungsten or carbon may be very suitable, because of its high resistance and melting point.

b) Heater Element

One purpose of the heater element (20) is to heat the temperature sensor (24). The heater element (20) can be a resistive heater or any other kind of heating arrangement such as a focused laser. By way of comparison to the thermal heater (18), which is used for writing one a media (34), the heater element (20) heats the temperature sensor (24) almost solely via a simple conduction mechanism, almost never via thermal near-field coupling effects. In addition, the heater element (20) has to be close to the temperature sensor (24) rather than close to the media as it is required for the thermal heater (1 8). Finally, the design guidelines are less strict for the heater element (20) than for the thermal heater used for heating, because the temperature sensor (24) rather than the heater element (20) determines the resolution of the reader. Some general guidelines for building nanoscale heaters can be found in the above chapter.

For the special purpose of the heater element (20), two guidelines, which are somewhat similar to the ones for the thermal heater (18) and for the temperature sensor (24) may be especially important for the heater design:

i) preferably, the heater element arrangement provides a very local heating of the temperature sensor (24), and avoids spreading of the heat throughout the head-like structure (30);

ii) generally, it is preferred to operate the assemblies at fairly high temperatures, because this operation may enhance the thermal coupling and consequently increase the signal to noise.

Figure 5A:
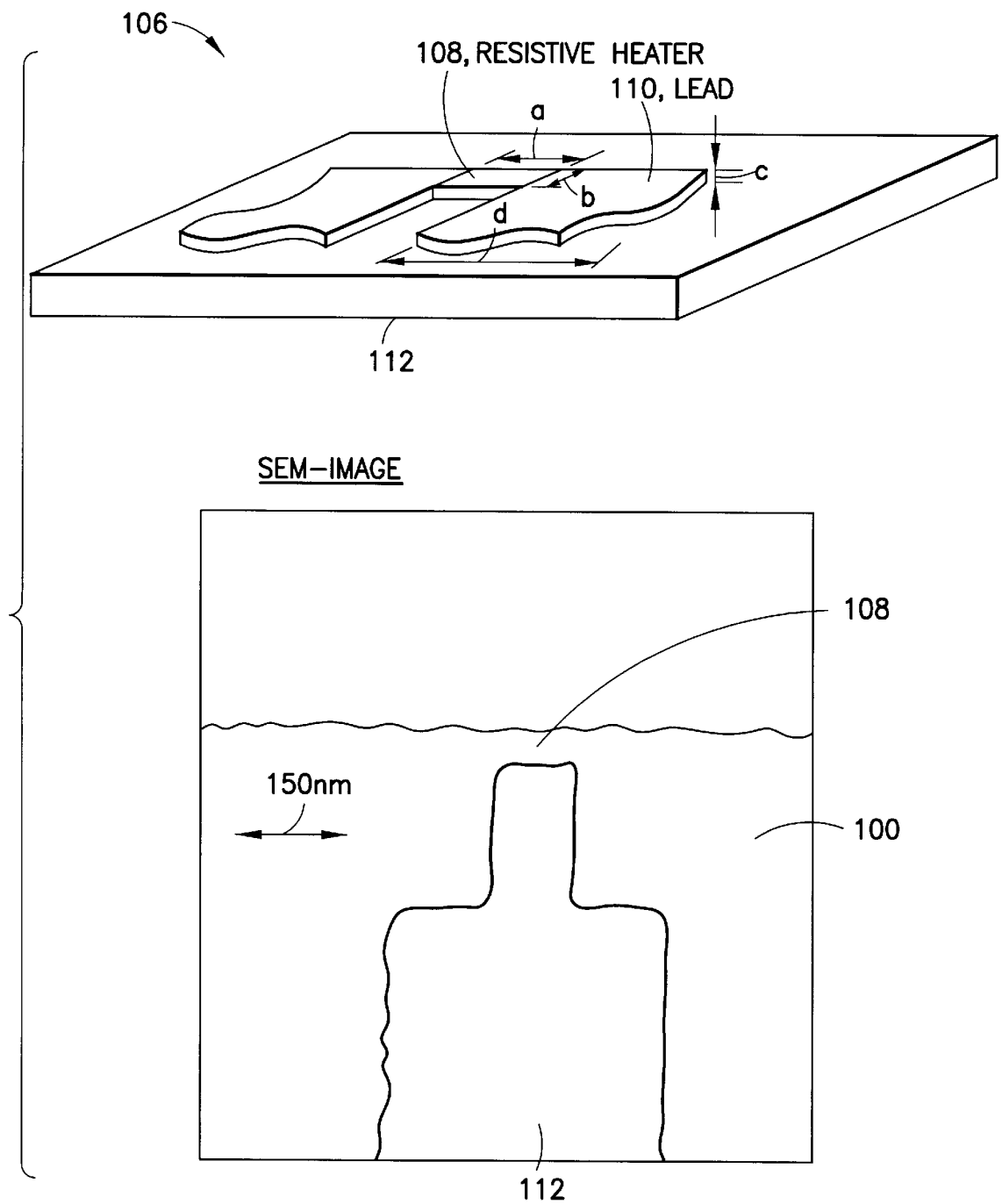

FIG. 5A (numeral 106) shows a resistive heater element (108) with small dimensions (preferably, a,b,c <1000 nm) in combination with preferably large (d>2000 nm) as well as thick (>20 nm) leads (110) with very low electrical resistance on a good thermal sink material (112) (e.g., diamond, low doped Si etc.) underneath the heater element (108). The thermal sink material (112) typically needs to have a high electrical resistance for insulation purposes. A scanning electron micrograph (SEM) image in FIG. 5A shows an example of a heater element (108), which has been built in accordance with these guidelines by focused ion beam (FIB) milling.

Another alternative for providing local heating exploits a geometry such as a tip structure, preferably with a small end radius (e.g., r<100 nm). This tip preferentially conducts the heat to the end of the tip and thus "focuses" the heat. In the FIG. 5B arrangement (114), a cantilever (116) of an atomic force microscope (AFM tip (118)) may be heated by a focused laser beam (120). For high speed application, it may be preferred that the length of the tip I is minimized (e.g., <1 $\mu$m).

Finally, it is noted that for both arrangements (106,114), with respect to the second guideline, chemical stable materials (e.g., Pt, Au etc.) or protective materials (e.g., $SiO_2$, carbon etc.) are preferably used so that high heating temperatures can be achieved.

c) Thermal Heater Element

The thermal heater element is a hybrid-type design between a heater element (20), which heats the temperature sensor (24) and a thermal heater (18) which is capable of writing on a media.

Temperature Element:

One purpose of the temperature sensor (24) is to monitor the thermal loading by a media (34) at high resolution.

The temperature sensor (24) can be any kind of temperature sensing element comprising thermocouples, thermistors with negative and positive temperature coefficient of resistance (NTC, PTC) or any other resistance temperature sensors. As an example, good thermocouples may include Fe/Constantan ($\approx$50 $\mu$V/K), Chromel/Alumel ($\approx$40 $\mu$V/K), Cu/Constantan ($\approx$40 $\mu$V/K), Ni/Fe ($\approx$40 $\mu$V/K), Bi/Sb ($\approx$105 $\mu$V/K) or combinations with semiconducting materials, where the differences in the Fermi-levels are fairly large. Typical NTC-thermistors are made of oxides of Mn, Co, and Ni with resistance changes in the $\approx$(2–7) %/K-range. PTC-thermistors consists of Si or some doped polycrystalline ceramics and show resistance changes of $\approx$2%/K. Examples for conventional resistance temperature sensors are devices made of Pt ($\approx$385%/K) or Ni ($\approx$0.6645%/K) or Cu ($\approx$0.421%/K).

The design guidelines for the temperature sensor element include the following facts:

i) the temperature sensor (24) is preferably small, because its dimensions determine the resolution of the assembly reader and thus the potential data densities;

ii) generally, it is preferred to operate the temperature sensor (24) at higher temperatures, because it may enhance the thermal coupling between sensor (24) and media (24); and iii) the temperature sensor (24) should be generally in close proximity to the media.

Figure 6A:
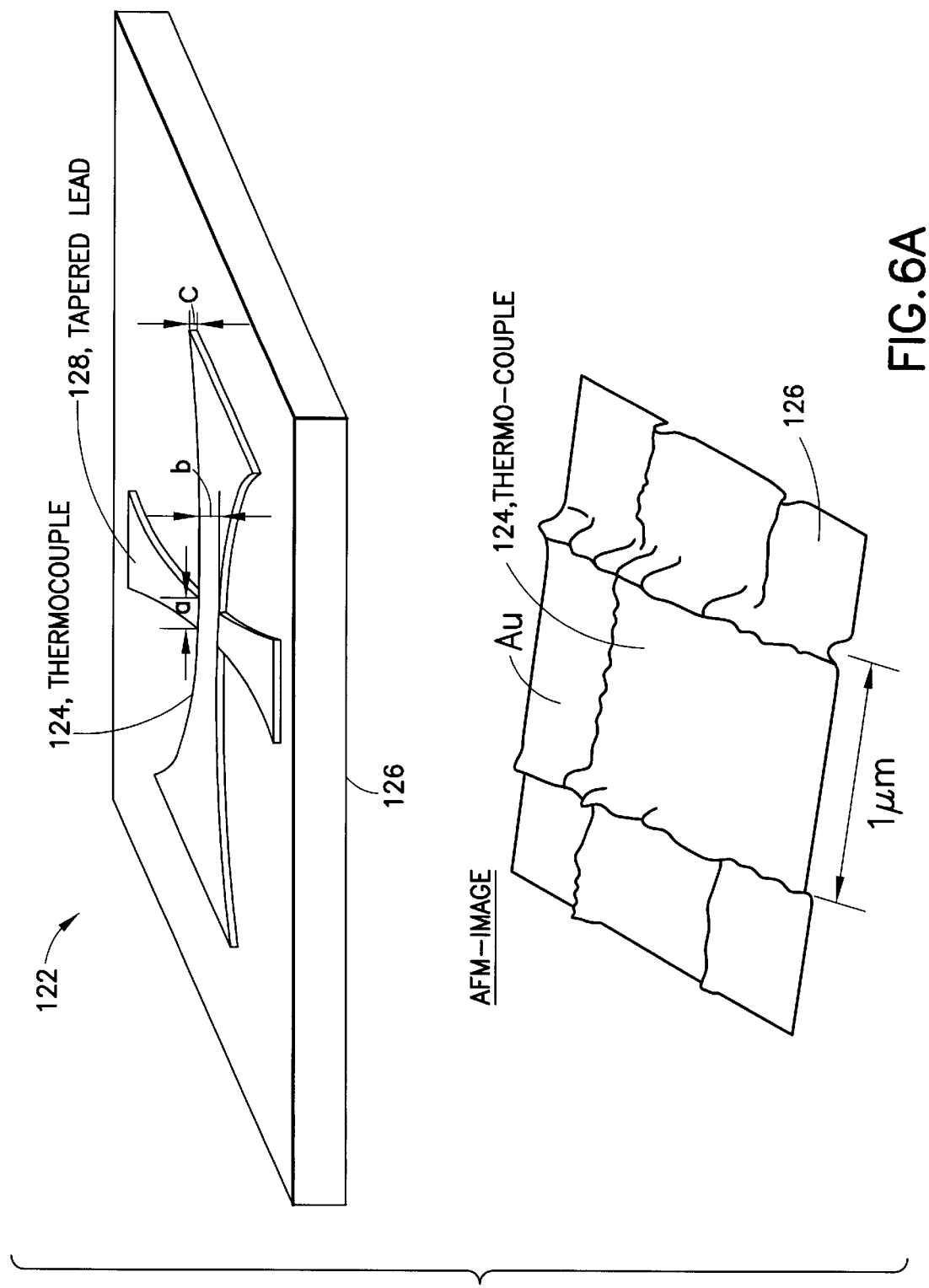

FIG. 6A (numeral 122) shows as an example for a temperature sensor (26) a small and thin thermocouple (124), preferably with dimensions a,b,c<1000 nm. In contrast to the heater element (20) and the thermal heater (18) it is preferred to mount the temperature sensor (26)/thermocouple (124) on a low heat conducting material (126, e.g., glass), which can potentially increase the signal. We note that this low heat conducting material (126) may be part of the head-like structure (30). It may be advantageous to taper the leads (128) slightly. The thermocouple (124) consists preferably of materials, which are chemically stable or the thermocouple may be embedded in a protective and chemically inert layer such as $SiO_2$. An AFM-image in FIG. 3A shows an actual thermocouple, which has been built by photolithography in accordance to the ideas of this invention.

FIG. 6B (numeral 130) illustrates an arrangement, wherein the temperature sensor (26) comprises a resistive element (132), preferably with small dimensions a,b,c<1000 nm. In order to enhance the sensitivity, the resistor (132) is preferably mounted on a low thermal conductive material (134, e.g., glass), which can be part of the head-like structure (30). The leads (136) are preferably large (d>2000 nm) as well as thick (>20 nm) and highly electrically conducting in order to avoid stray resistance.

Device Comprising a (Thermal) Heater Element and a Temperature Sensor

Figure 7:
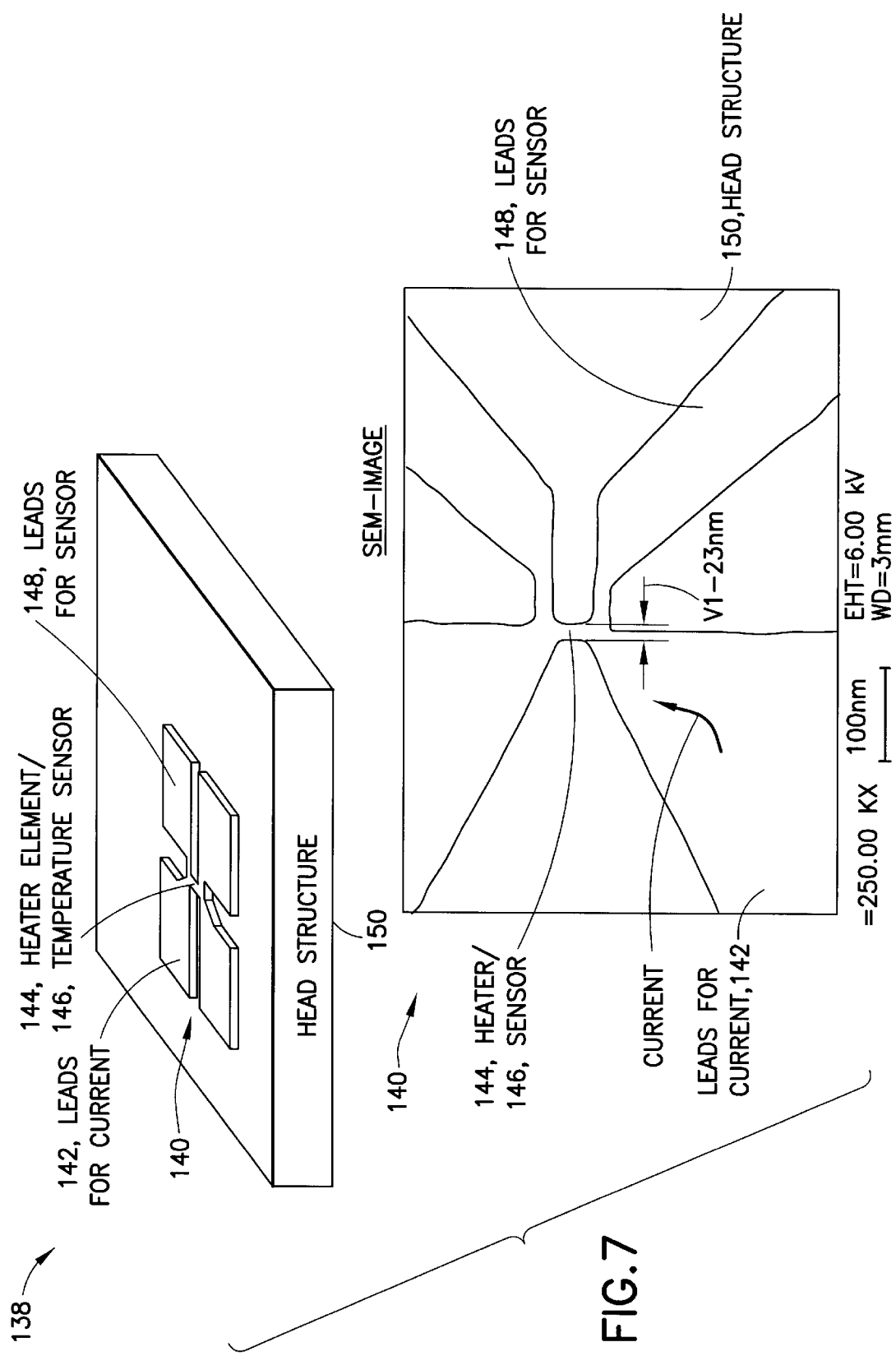
FIG. 7 shows a device of the present invention comprising a (thermal) heater element and a temperature sensor realized in a single four terminal device.

FIG. 7 (numeral 138) shows a device (26,28) which comprises a (thermal) element (18,20) and a temperature sensor (24) realized in a single four terminal device (140). The large leads (142) can supply the current for Joule heating the (thermal) heater element (144)/sensor (146). The temperature of the sensor (146) can be monitored by measuring the voltage drop across the resistor sensor (146) using sensor leads (148). If the thermal coupling between resistor and media is strong, additional power is drawn out of the resistor, which decreases its temperature. Consequently, the electrical resistance of (146) is lowered, which can be monitored as a voltage change. In addition, the lowered resistance decreases the amount of dissipated electrical power at a constant current. Typically, the four terminal arrangement (140) is preferably imbedded in a head structure (150), which has preferably low heat conductivity (e.g, glass). As an example, the SEM-image in FIG. 7 shows such a device, which has been made by e-beam lithography. Neglecting heat dissipation in the leads and simulating the device as a single resistor, the performance of such an device acting as a reader can be simply estimated given:

1) the resistance of the heater (144)/sensor (146) element at room temperature ($R_o$);

2) the temperature dependence of the heater (144)/sensor (146) element ($R(T)=R_o(1+\alpha T)$);

3) the power ($P_t$) flowing to a media (34) in the case of strong thermal coupling; and 4) the thermal gain ($M_1$=[K/W]), which allows one to calculate the temperature increase as a function of the power (T=$M_1$ P) in the resistor.

$M_1$ may depend strongly on the thermal properties (e.g., thermal conductivities) as well as dimensions and geometry of the head structure (30). Simple considerations yield for the voltage change dV in a first order approximation $$dV \approx -R_o I \alpha M_1 P_t/(1-R_o I^2 \alpha M_1),$$

where I is the current supplied by the heater. As an example, $\alpha$=1/273 K, $M_1$=1 K/$\mu$W ($SiO_2$ substrate), $R_o$=100$\Omega$, $P_t$=2 $\mu$W (typical near-field power flow for 20×20 $nm^2$) and I=1 mA results in a voltage change of dV$\approx$−1.1 mV. Considering an amplifier noise of $\approx$3 nV/$Hz^{0.5}$ and neglecting shot-noise contributions due to the supplied current a signal to noise ratio of SNR>20 dB in 100 MHz can be obtained. The power dissipated in the heater is then 157.8 $\mu$W and 156.6 $\mu$W, corresponding to 157.8$\Omega$ and 156.6$\Omega$ and 157.8° C. and 156.6° C. without and with the thermal coupling, respectively. The situation can be greatly improved by increasing the thermal power gain ($M_1$) (e.g., in practice the head material would have a lower heat conductivity). For example, with $M_1$=5 K/$\mu$W similar signal levels could be obtained with almost one order of magnitude less power flow ($P_t$). It should be noted that the further increase of the thermal gain ($M_1$) may be limited by shot-noise constraints (i.e., less current is supplied, which shows a larger fractional shot-noise limit) as well as speed considerations. However, as far as it concerns the reading speed, for the cases discussed above, simple thermal diffusion considerations demonstrate that data rates much larger than 100 MHz can be accomplished. Specifically, diffusitivities ($\kappa$) as low as $\kappa \approx 4 \cdot 10^{-8}$ m$^2$/s can be tolerated considering the small heater dimensions (i.e., 20 nm). By way of comparison, a typical metal exhibits difflusitivities of $\kappa \approx 2 \cdot 10^{-5}$ m$^2$/s, while a good thermal insulator such as SiO$_2$ still shows a large enough diffusitivity of $\kappa \approx 9.6 \cdot 10^{-7}$ m$^2$/s.

Head-like Structure

The different heaters and temperature sensors preferably are mounted to at least one head-like-structure (30). Examples for head-like structures can be found further below. The purpose of these structures (30) can be threefold:

1) it can serve as a support for the different elements of the read/write assembly;
2) the thermal properties of the head (30) can be used in order to increase the signal of the reader as well as to control the diffusion of heat (i.e., the reading speed);
3) the thermal properties of the head (30) can be used to minimize the loading by the surface for the writing and to control the spreading of heat within the head
4) the head structure (30) may include (in analogy to magnetic storage) an air-bearing surface so that it can be flown over a media disc at a very close distance.

Controller

The FIG. 1 assemblies includes a controller (32) for coordinating the mutual positioning of the head-like structure(s) (30) and a media (34). It is preferred that this controller (32) functions so that the thermal coupling subsumes at least one portion of the thermal near-field. A suitable controller can use an actuator, which may be selected from the group consisting of a piezo-electric actuator, an electro-static actuator, an electromagnetic actuator, a magnetic-strictive actuator, and a thermal-mechanical actuator.

Media

In principle, any kind of media (34) can be used. Preferably, a media is chosen which shows very large differences in a thermal coupling between bits (e.g., 1 and 0 etc.). As an example, potential read/erase/write media phase-change materials (e.g., GaSb, InSb, GaSeTe, Ag,InSbTe etc.), as they are used in optical read-write compact discs, may be utilized. The thermal conductivity of the crystalline regions is up to 10 times larger than the regions which are amorphous. Such a difference should be enough, especially for a thermal reading method which involves simple conduction or thermal near-field effects. Experiments on thermal near-field phenomena, as well as various theories (e.g., J. B. Pendry, J. Phys.:Condens. Matter 11, 6621 (1999)) based on fluctuation-dissipation concepts, suggest that the heat transfer depends strongly on the resistivity of the media. In the case of the phase-change media, crystalline regions show up to 100 times less resistivity than amphorous regions, which should provide for enough contrast and signal/noise for high speed read/write storage applications.

Another example for such media which are based on very large resistance changes are conjugated organic materials (e.g., complex of 3-nitrobenzal malononitril and 1,4-phenylenediamine where the high impedance state has a resistivity of $10^{-8} \Omega$cm reducing to $10^{-4} \Omega$cm in the conductive state (Gao et al, Phys. Rev. Lett., 84 1780 (2000))). We also like to note that details of the media structure (underlayers, substrates, etc.) may be crucial. As a general guideline, for reading it may be an advantage to have a high thermal conductivity substrate in order to optimize the thermal loading of the head by the media. However, somewhat in contrary for writing a low thermal conductivity substrate is preferred in order to ensure sufficient heating for a given power density.

Heat Transfer Mechanism

The reading/writing assembly of the present invention is based on some type of coupling between the sensor (24) or device (26) or thermal heater (18) or thermal heater element (20) and a media (34), which transfers some energy to the media (34) and thus cools the temperature sensor (24). Generally, this thermal coupling can involve any kind of energy/heat involving phonons, electrons, photons, plasmons, and excitions. The mechanism for transferring the heat from the head to the media can be any kind including diffusive, conductive, convective, radiative (subsuming far-field and/or near-field) and ballistic.

In the following, some general aspects of heat transfer mechanisms are discussed: (i) The heat transfer (e.g., J. B. Lu et al. J. Appl. Phys. 76, 7209 (1994)) is generally diffusive if the mean free path of the molecules l is less than the gap d between reader and media (e.g., d>1 $\mu$m). (ii) However, if l>d, the molecules in the junction go from the heater to the media without collisions, and transfer the heat in a ballistic way (e.g, d<1 $\mu$m). (iii) In addition, in the far-field region propagating waves can transfer radiatively power, which can be described by the Stefan-Boltzmann law. (iv) Furthermore, non-propagating waves (frustrated waves) are capable of transferring the heat when sensor (14) and media (24) are very close to each other (near-field region). From a physics point of view, the charges within the heated region are thermally excited, which can generate a significant driving field. This driving field results in a near-field, which can couple to the media in the near-field region. As near-field region, distances may be considered which are below the thermal radiation wavelength. The thermal radiation wavelength $\lambda_T$ is given by Wiene's displacement law. For example, at a head temperature of 800 K, $\lambda_T$ is $\approx$4 $\mu$m, so that distances larger than $\lambda_T$ may be attributed to the far-field region while distances smaller than $\lambda_T$ may be considered as near-field region. (v) Finally, if the head is in direct contact with the media, heat is transferred via simple conduction.

Particular Assemblies of the Present Invention

Figure 8A:
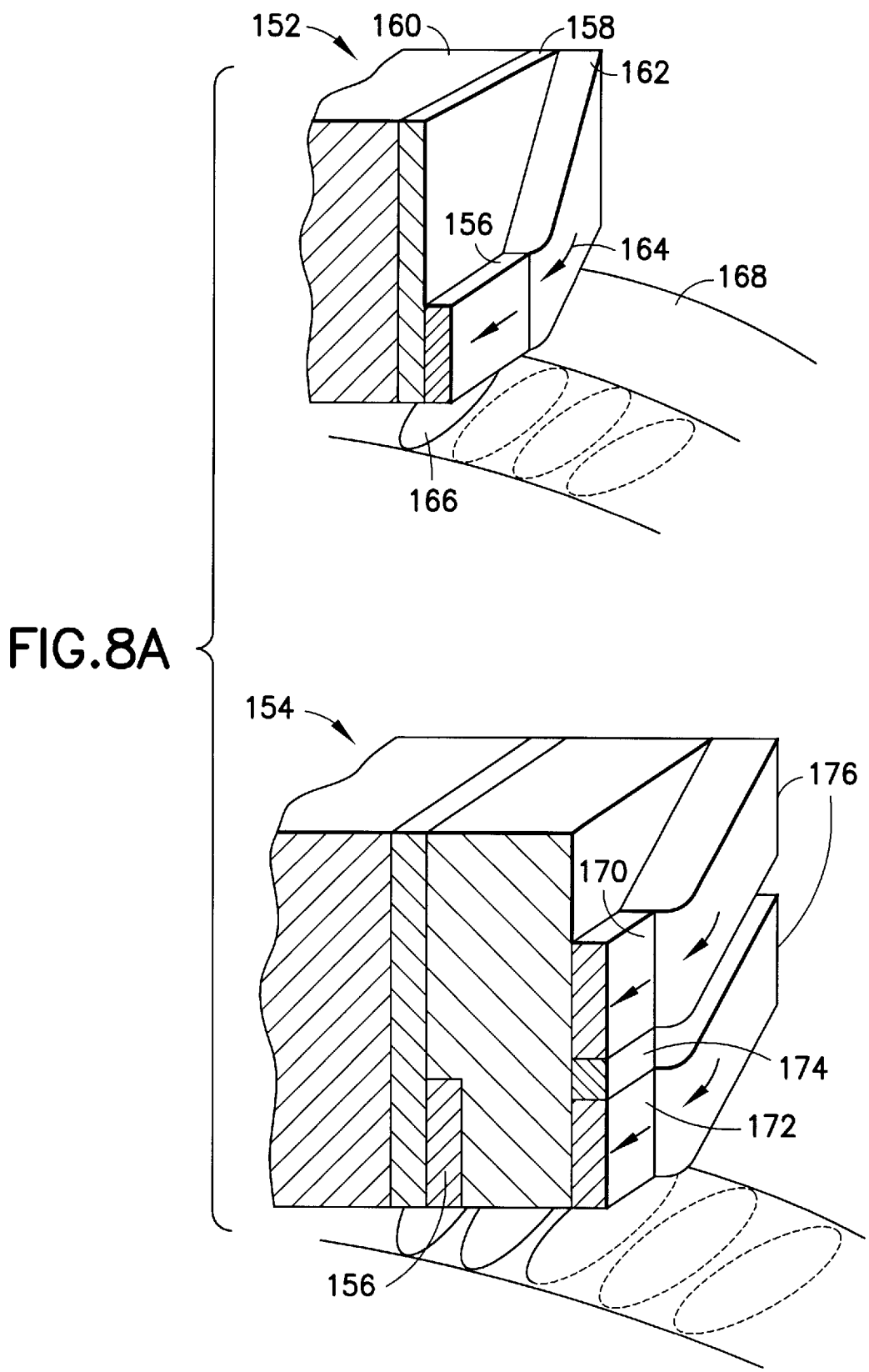
FIGS. 8A–D show particular assemblies, which may be built in accordance with the four different aspects of this invention.

FIG. 8A through 8D show possible embodiments of a head capable of reading/writing/ erasing. FIG. 8A (top view: numeral 152, bottom view: numeral 154) shows cross-sectional views of the thermal head. For purposes of clarity only the thermal heater (156) is shown in the top view (152). The thermal heater (156) is a thin electrically resistive material, of rectangular shape, fabricated on a thin electrically insulating layer (158) that is deposited on a heat-sink substrate with high thermal conductivity (160). Two current carrying leads (162) are connected - and supply current (164)—to the thin thermal heater (only one lead is shown). The current (164) brings the thermal heater (156) to an elevated temperature, and also heats a small area (or domain) (166) on the spinning disk (168) under the thermal heater. The bottom view (154) is similar to top view, with the addition of heater element (170) and temperature sensor (172) for reading data. The heater element (170) is similar to the thermal heater (156) as described above, except that its main function is to heat the sensor (172), via a heat-conducting (and electrically insulating) coupling element (174). Two current carrying leads (176) provide current to the heater element (only one lead is shown). The sensor (172) described here is a resistive sensor: temperature changes are measured through changes in electrical resistivity of the sensor element. A small current is passed in the sensor element (172) via two current carrying leads (only one lead is shown), in order to measure the change of electrical resistivity.

Figure 8B:
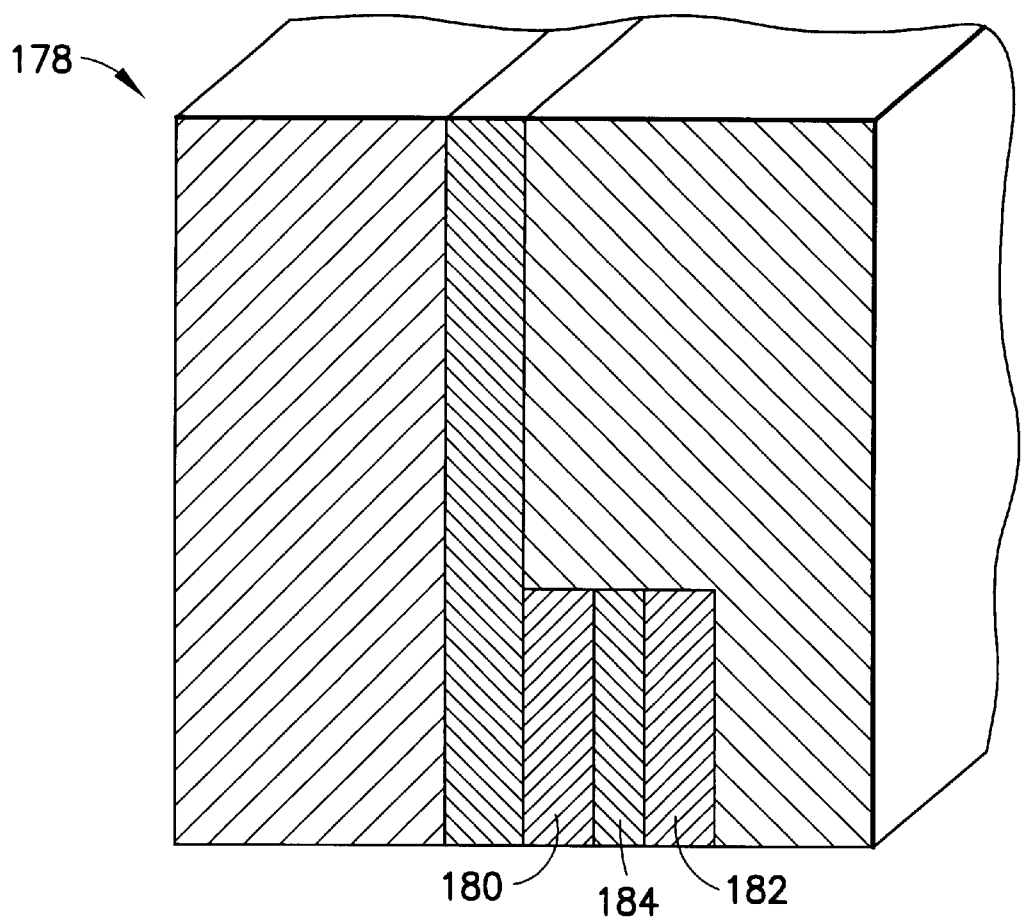

In FIG. 8B a cross-sectional view of a possible embodiment (178) for the thermal head is shown, where the thermal heater (for writing data) and the heater element (for heating the sensor) are one and the same component (thermal heater element (180)). It is similar to the thermal heater (156) of FIG. 8A (152), and heats the spinning disk to write data. It also heats the temperature sensor (182) via a heat-conducting (and electrically insulating) coupling element (184), for the purpose of reading data. For reading data, the temperature of the heater is lower than for writing data, in order not to re-write or erase the existing data.

Figure 8C:
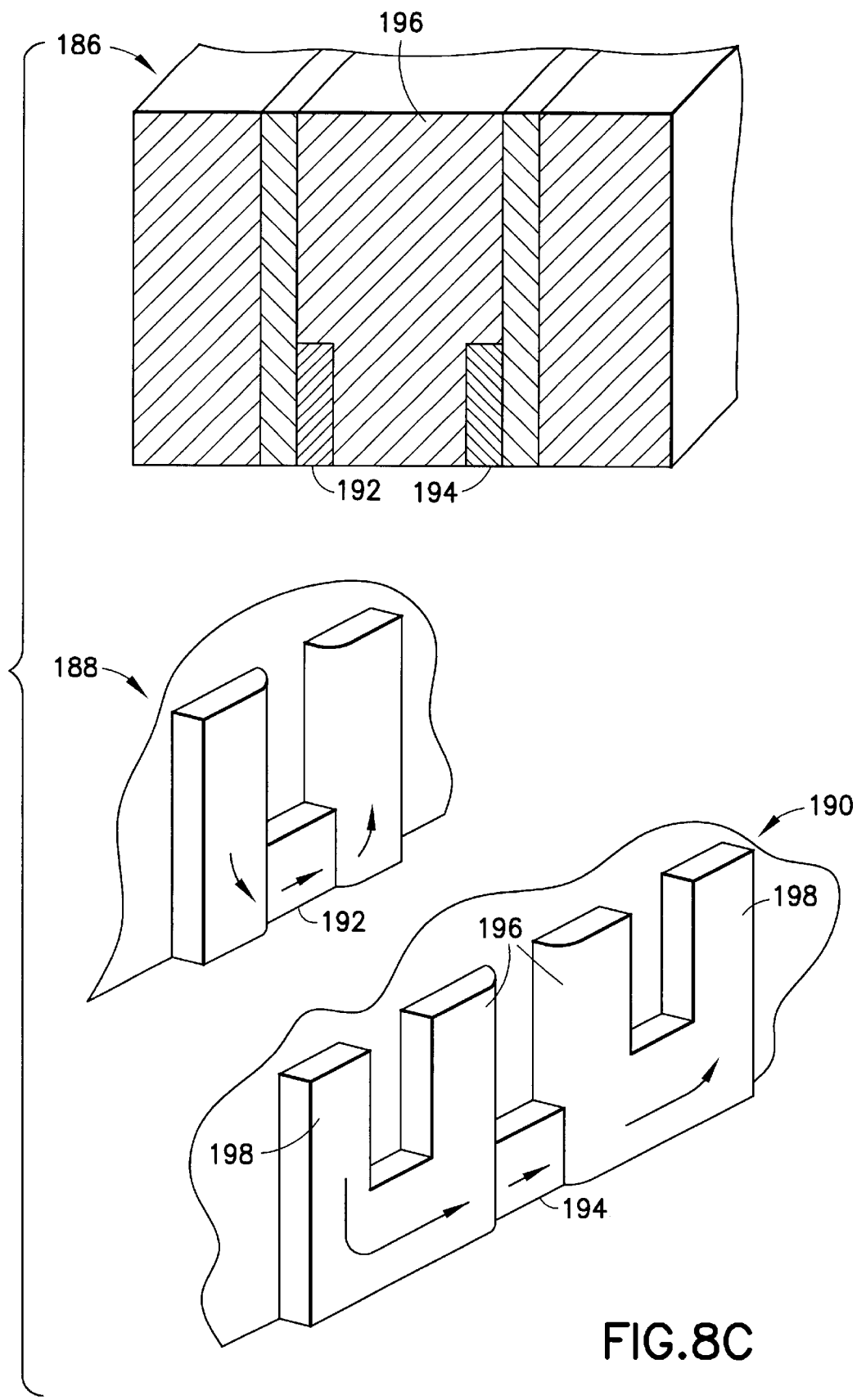

FIG. 8C (top view: numeral 186, bottom left view: numeral 188, bottom right view: numeral: 190) shows a possible embodiment for the thermal head, where a thermal heater (192) in combination with a device (194) is used, which comprises the heater element and the thermal sensor. The device (for reading) and the thermal heater (for writing) are separated by insulating layer (196) for thermal and electrical insulation purposes. The bottom left view (188) shows the thermal heater (192) for writing data, similar to the thermal heater (156) of FIG. 8A. The bottom right view shows the device (194) comprising heater/sensor element for reading data. The device is a thin electrically resistive material, of rectangular shape, fabricated on a thin electrically insulating layer that is deposited on a heat-sink substrate with medium thermal conductivity. Electrical connections are fabricated to provide for a 4 terminal type device: two current sensing leads (196) and two current carrying leads (198).

Figure 8D:
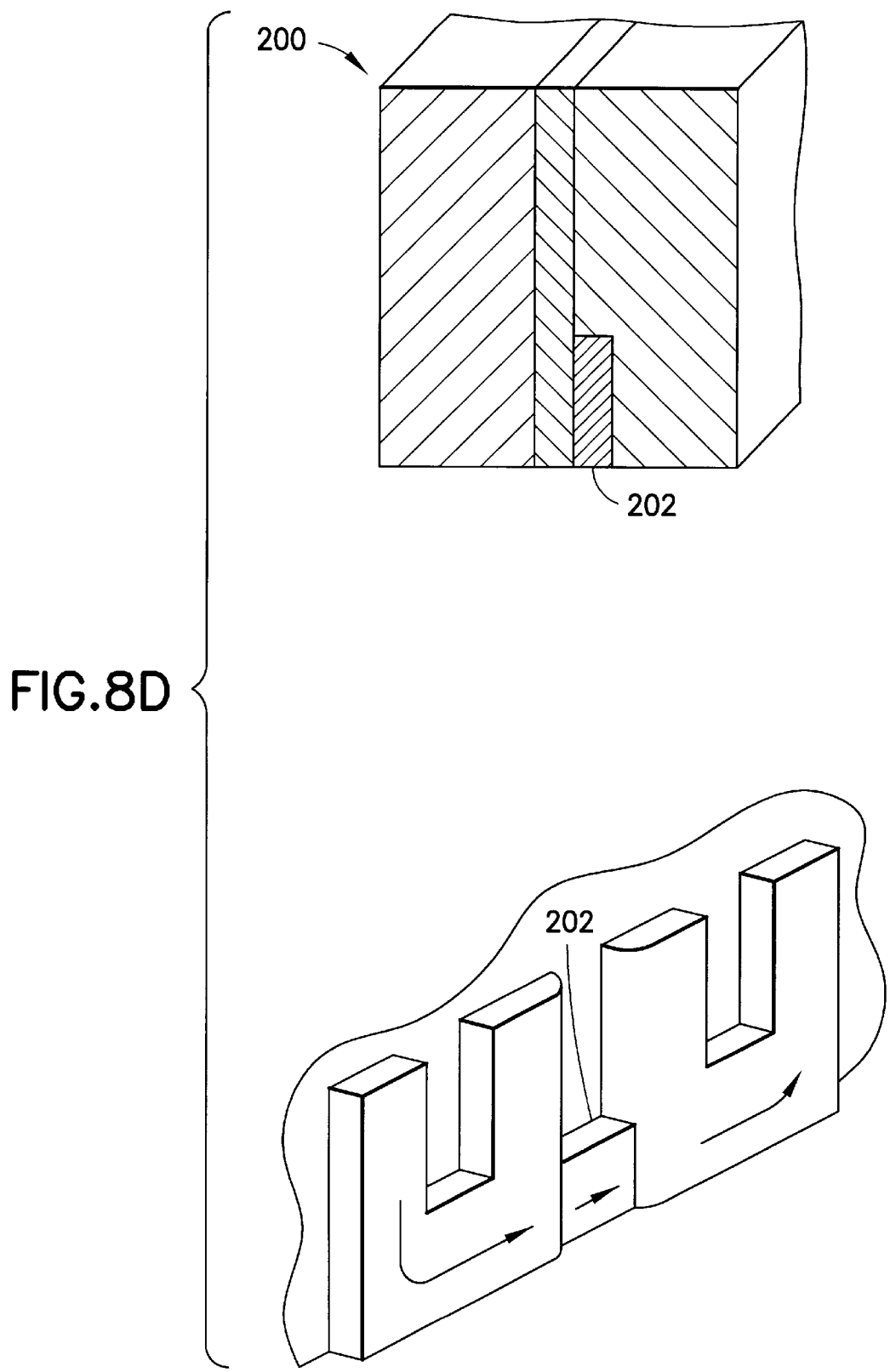

FIG. 8D (numeral 200) shows a cross-sectional view of a possible embodiment for the thermal head, where one device (202) is used which comprises a thermal heater element and the thermal sensor. The device is capable of reading/writing/erasing data on a media.

What is claimed:

1. A reading/writing/erasing assembly comprising:
   i) a thermal heater for writing on a media;
   ii) a temperature sensor capable of monitoring thermal coupling between the sensor and a media;
   and
   iii) a heater element for heating the temperature sensor.

2. A reading/writing/erasing assembly comprising:
   i) a thermal heater for writing on a media;
   ii) a temperature sensor capable of monitoring thermal coupling between the sensor and a media;
   iii) a heater element for heating the temperature sensor;
   iv) at least one head-like structure for supporting the thermal heater, heater element and temperature sensor;
   and
   v) at least one controller for mutual positioning of the thermal heater and/or temperature sensor and a media.

3. A reading/writing/erasing assembly comprising:
   i) a thermal heater element for writing on a media and/or for heating the temperature sensor;
   and
   ii) a temperature sensor capable of monitoring thermal coupling between the sensor and the media.

4. A reading/writing/erasing assembly comprising:
   i) a thermal heater element for writing on a media and/or heating the temperature sensor;
   ii) a temperature sensor capable of monitoring thermal coupling between the sensor and the media;
   iii) at least one head-like structure supporting the thermal heater element and the sensor;
   and
   v) at least one controller for mutual positioning of the thermal heater element and/or temperature sensor and a media.

5. A reading/writing/erasing assembly comprising:
   i) a thermal heater for writing on a media;
   and
   ii) a device comprising;
      a) a temperature sensor capable of monitoring thermal coupling between the sensor and a media; and
      b) a heater element for heating the temperature sensor.

6. A reading/writing/erasing assembly comprising:
   i) a thermal heater for writing on a media;
   ii) a device comprising;
      a) a temperature sensor capable of monitoring thermal coupling between the sensor and a media; and
      b) a heater element for heating the temperature sensor;
   iii) a least one head-like structure for supporting the thermal heater and the device;
   and
   iv) at least one controller for mutual positioning of the thermal heater and/or device and a media.

7. A reading/writing/erasing assembly comprising:
   i) a device comprising;
      a) a temperature sensor capable of monitoring thermal coupling between the sensor and a media; and
      b) a thermal heater element for heating the temperature sensor and for writing on a media.

8. A reading/writing/erasing assembly comprising
   i) a device comprising;
      a) a temperature sensor capable of monitoring thermal coupling between the sensor and a media; and
      b) a thermal heater element for heating the temperature sensor and for writing on a media;
   ii) a head-like structure for supporting the device;
   and
   iii) a controller for mutual positioning of the device and the media.

* * * * *